United States Patent Office 2,920,083
Patented Jan. 5, 1960

2,920,083
METHOD OF PRODUCING A COMPOUND WHICH IS CAPABLE OF INCREASING THE CALCIUM CONTENT OF THE BLOOD

Engbert Harmen Reerink, Weesp, Netherlands, assignor, by mesne assignments, to North American Philips Company, Inc., New York, N.Y., a corporation of Delaware No Drawing. Application February 7, 1956
Serial No. 563,863

Claims priority, application Netherlands February 15, 1955

4 Claims. (Cl. 260—397.2)

It is well-known that, when the preparation produced by the irradiation with ultra-violet light of ergosterol is reduced with sodium and alcohol, a substance is obtained which can be used to increase the calcium content of the blood. However the ultra-violet irradiation product of provitamin $D_3$ has hitherto not been subjected to a similar process and until now nothing of the resultant product was known.

According to the invention it has been found that by similarly reducing the crude ultra-violet irradiation product of provitamin $D_3$ a new and novel product is obtained which causes an increase in the calcium content of the blood to an extent which considerably exceeds the influence of the product produced by the reduction of the ultra-violet irradiation mixture of ergosterol.

The product obtained by the method in accordance with the invention inter alia has the advantage that in medical treatment in order to achieve the same effect, a smaller amount of the novel product is sufficient than was required when using the conventional preparation.

It was found that the increase of the calcium content of the blood serum of rats due to the action of dihydrotachysterol-3 was more than twice that due to dihydrotachysterol-2, the toxic limit doses of both substances being equal.

According to the invention, a method for producing a compound capable of increasing the calcium content of the blood is characterized in that the product obtained by irradiation with ultra-violet light of 7-dehydrocholesterol is reduced with an alkali metal and an alcohol.

The reduction can be carried out satisfactorily with sodium and ethanol. However, better results are achieved by using an aliphatic alcohol having at least three carbon atoms such as, for example, propanol, propanol-2, butanol, 2-methyl butanol-2. Excellent results are also obtained with the use of lower saturated aliphatic dihydroxy alcohols such as ethanediol-1,2 or propanediol-1,3. As an alkali metal, sodium is preferably used.

It is an important condition that the reaction be carried out at a temperature exceeding 70° C. Very satisfactory results are obtained by carrying out the reduction at a temperature of approximately 140° C.

For the reason stated in the preceding paragraph the reduction is preferably carried out in a solvent having a comparatively high boiling point, for example toluene, xylene.

Example I

In a round-bottomed flask which was provided with an agitator, a dropping funnel and a reflux condenser, 160 ml. of anhydrous xylene and 20 gms. of sodium are introduced. The xylene is heated to boiling temperature and the sodium is finely divided in the liquid by thoroughly stirring. By means of the dropping funnel the reaction mixture has 2 ml. of anhydrous ethane diol and immediately afterwards a solution of 10 gms. of crystalline vitamin $D_3$ in 40 ml. of anhydrous xylene added to it. The reaction velocity is high. When the reaction is terminated, an additional amount of 48 ml. of ethane diol is added in a period of time of approximately 45 minutes. The reaction mixture is heated to boiling temperature for a period of 15 minutes and subsequently cooled in ice and water. By means of the dropping funnel cold water is added drop by drop in order to convert any excess of sodium. The mixture is transferred to a separating funnel, the xylene layer is separated and the water layer is extracted with the use of ether. The xylene and ether solutions are together evaporated in vacuo at the lowest possible temperatures without previous drying. The obtained resinous residue is light yellow and exhibits a characteristic light absorption in the ultra-violet with peaks at $242\mu$, $251\mu$ and $261\mu$. The obtained resin is dissolved in oil and the oil solution was used in a number of experiments made of rats according to the method of McChesney and Kocher (Endocrinology 30, 787 et seq. (1942)). A number of experiments showed that 2.65 mgs. of the reduction product obtained in the above-described manner produced an increase in the calcium content of the blood which was at least equal to the increase produced by 6 mgs. of the reduction product of the preparation obtained by irradiation of ergosterol with ultra-violet light.

Example II

A solution of 7-dehydrocholesterol in ethanol is irradiated with ultra-violet light. The non-converted 7-dehydrocholesterol is removed by recrystallisation from alcohol. The mother liquor containing the irradiation product is evaporated and the residue is dissolved in 50 ml. of anhydrous xylene. After the addition of 25 gms. of sodium the mixture is heated, in a round flask provided with an agitator and a reflux condenser with the exclusion of oxygen and water in an oil bath of 150° C. While stirring, 100 ml. of anhydrous xylene and 150 ml. of anhydrous 2-methyl butanol-2 are added to the mixture. The mixture is subsequently heated for 5 hours at a temperature of 150° C., and then cooled to room temperature. Any excess of sodium is converted by the addition of 90% aqueous ethanol. The solution is extracted five times each time with the use of 300 ml. of 5% common salt solution, in order to remove sodium hydroxide and sodium alcoholate. The extracted liquid is subjected to steam distillation so that the xylol distils over. The distillation residue is dissolved in diethyl ether and washed with an aqueous 5% solution of sodium chloride. The solution is dried over sodium sulphate and distilled in order to evaporate the ether. On spectrophotometric examination the alcoholic solution of the distillation residue exhibits maximum values at 242 m$\mu$, 251 m$\mu$ and 259 m$\mu$.

The dihydrotachysterol-3 of the invention may be injected into mammals in the form of an aqueous dispersion or solution thereof.

What is claimed is:
1. Dihydrotachysterol-3.
2. A solution of dihydrotachysterol-3 in an organic solvent.
3. An aqueous dispersion of dihydrotachysterol-3.
4. An ethanolic solution of dihydrotachysterol-3.

References Cited in the file of this patent
UNITED STATES PATENTS 2,776,304    Klein _____ Jan. 1, 1957

OTHER REFERENCES

Fieser and Fieser: Natural Products Related to Phenanthrene, 3rd edition, pages 176 and 177.
Chemical Abstracts, vol. 33, page 86212 (1939).